March 22, 1966  D. E. CLARK  3,241,312
THRUST DEFLECTOR

Filed Sept. 18, 1963  2 Sheets-Sheet 1

INVENTOR.
DONALD E. CLARK
BY John F. Cullen
ATTORNEY

March 22, 1966　　　D. E. CLARK　　　3,241,312
THRUST DEFLECTOR
Filed Sept. 18, 1963　　　　　　2 Sheets-Sheet 2
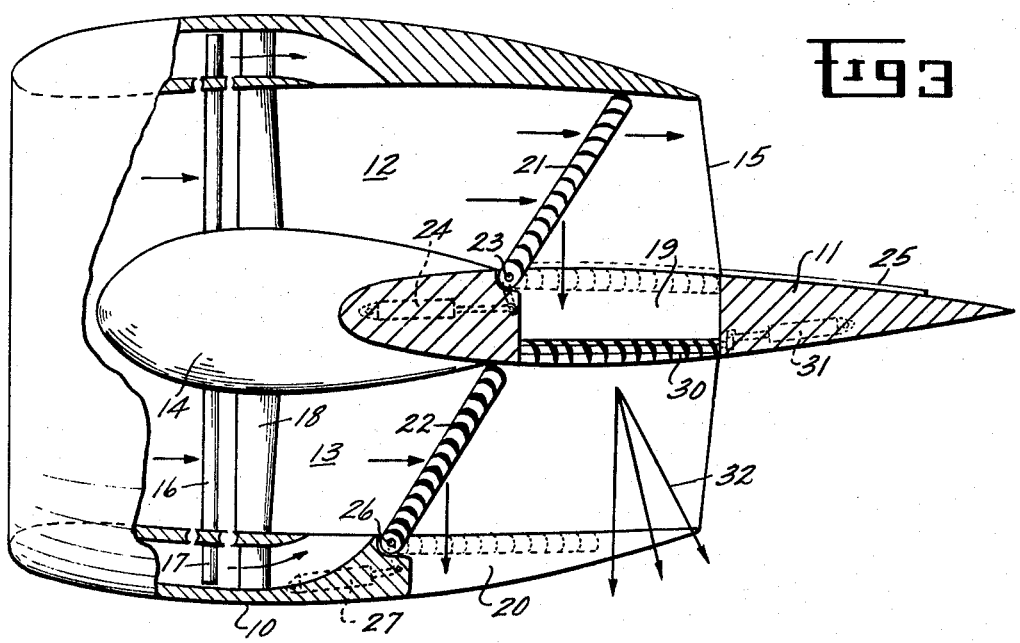
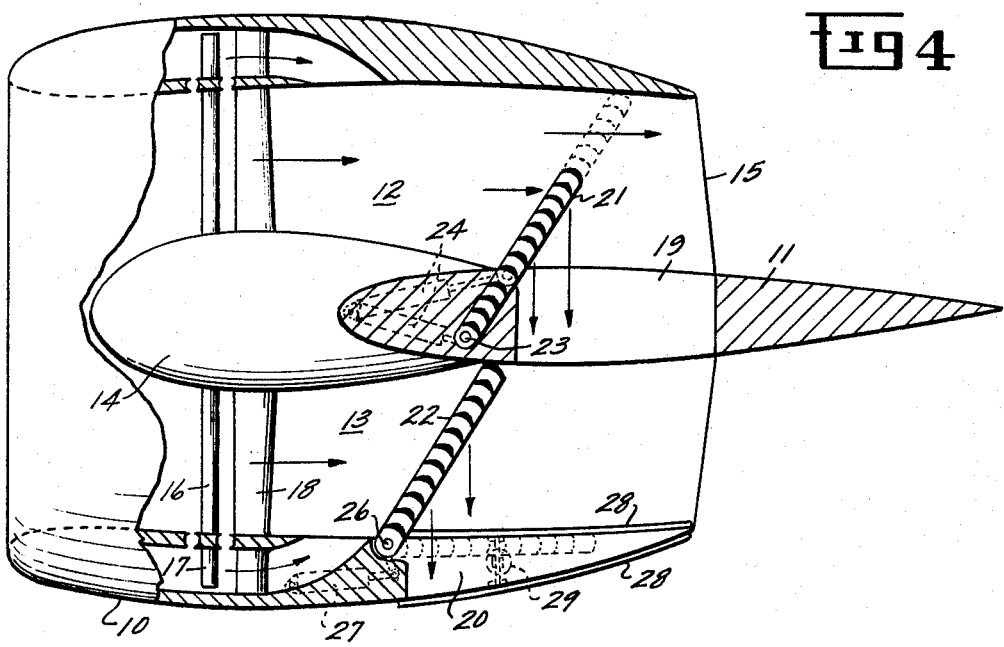
INVENTOR.
DONALD E. CLARK
BY John F. Cullen
ATTORNEY—

United States Patent Office 3,241,312
Patented Mar. 22, 1966

3,241,312
THRUST DEFLECTOR
Donald E. Clark, Cincinnati, Ohio, assignor to General Electric Company, a corporation of New York
Filed Sept. 18, 1963, Ser. No. 309,656
10 Claims. (Cl. 60—35.54)

The present invention relates to a thrust deflector, and more particularly, to a thrust deflecting means for use in a cruise fan type powerplant spanning an airfoil such as a wing. Additionally, means for reversing the thrust is also disclosed.

A typical powerplant considered for aircraft propulsion is the type known as a cruise fan. Generally, this is a powerplant in which a centerbody may carry a large fan at its forward end and the fan, in turn, is surrounded by a tubular casing or nacelle through which air is pumped by the fan to produce thrust. Conveniently, the fan may be of the tip turbine type where turbine buckets are mounted on the end of the fan blades and driven by exhaust gas from a gas generator that may be located elsewhere. Such powerplants are highly efficient and move large quantities of air at low velocities. Additionally, in an aircraft employing such powerplants, it is desirable to provide lift on the aircraft and this may be done by rotating the whole engine, be it a jet engine or a cruise fan, in a well known manner. Also, the exhaust stream may be deflected downwardly without actually rotating the engine. The difficulty with rotating a cruise fan in its nacelle is that cruise fans are generally quite large both in diameter and length. Rotation is impractical since the powerplant might strike the ground, its proximity to the ground creates undesirable back pressures, and rotation also requires very large actuation forces. Furthermore, in some installations, it is desirable to have the nacelle mounted on the forward edge of the wing to provide airflow over and under the wing. In other words, the wing may cut the nacelle substantially in half with half the nacelle above and half below the airfoil or wing. Because of the presence of the fan, and the desirability of having it forward of the leading edge of the wing for balance purposes, there are therefore two separate airstreams on each side of the wing. Such a construction does not permit rotation of the nacelle and a more practical means of obtaining vertical lift in such a powerplant is to divert or deflect the fan stream downward. This creates difficulty of course with the upper stream over the top surface of the wing. If deflection downward is to be obtained of this airstream a means may be provided at the trailing edge of the wing. This locates it far back and the line of thrust of the vertical force is far back of the center of gravity and undesirable.

Additionally, the cruise fan is different from an ordinary jet engine in that it is a low pressure ratio device and is quite sensitive to back pressure. That is, if blockage is imposed behind the fan to turn or deflect the flow downward, the back pressure on the fan is increased and it will result in a performance loss.

The most effective way to turn the flow is through a cascade of louvers which do not produce much back pressure and can operate on a free stream. A cascade can thus turn the flow without any appreciable pressure drop. Such a cascade merely consists of a series of preferably airfoil louvers that may be fixed in a frame or may be made to rotate in a frame or whose camber may otherwise be changed. Generally, such cascades with louvers therein are well known.

Cruise fans are generally quite large in diameter as previously noted, in order to move a large mass of air of low velocities. Consequently, injecting a cascade across the cruise fan exhaust creates a problem of what to do with the cascade when deflected thrust is not desired. In other words, during the cruise mode, the cascade must be stowed out of the way in a practical manner. In operation, it must intercept the stream at an angle, for example 45° which, in conjunction with the camber of the individual louvers, may deflect the flow 90° or more downward with little pressure change across the fan. Additional turning beyond 90° by a different camber or by movable louvers, as well as a different angle of the whole cascade frame, may provide thrust reversing in a cruise fan. Furthermore, in the type of cruise fan contemplated herein, the engine is cut transversely by an airfoil such as the wing, and the upper stream of air is difficult to deflect in conjunction with the lower stream which may be freely deflected below the engine for vertical lift.

Cruise fans may generally take two forms. They may be of the plug nozzle type which, in conjunction with a shroud around it, forms a nozzle between the plug and shroud and the plug extends beyond the downstream end of the shroud. The annular nozzle between the two may be varied to provide different thrust. In such an application, the plug member is convenient for stowage of the cascades and such a type is shown in co-pending application, Serial No. 309,689 filed September 18, 1963 and assigned to the assignee of the instant invention. The other type of cruise fan may employ the finger type nozzle for reasons of installation and performance and this differs from the plug nozzle arrangement in providing a casing or nacelle with a variable well known finger nozzle or its equivalent at the downstream end of the casing member. In this type powerplant a centerbody may be provided as an aerodynamic member for the flow of fluid through the casing and may also be supported centrally of the casing and carry a cruise fan for accelerating air through the casing or nacelle for thrust. Additionally, in the wing installation as disclosed in the present invention, the centerbody may form the anchor point for the whole powerplant. The cruise fan may conveniently be a tip turbine fan of the type that is well known in the art and is driven by exhaust gas acting on turbine buckets and then exhausting into the airstream. It is this latter type of powerplant, airfoil or wing mounted, to which the thrust deflector of the instant invention is directed.

The primary object of the present invention is to provide a thrust deflector of the type described which may be easily stowed within the confines of the structure present in the jet propulsion powerplant and directs both streams, above and below the airfoil or wing, together into a deflected thrust.

Another object is to provide such a thrust deflector in a wing mounted cruise fan type installation where substantially half of the thrust fluid is above the wing and the other half is below.

A further object is to provide a deflector that may be used for reversing the thrust.

Another object is to provide a wing mounted cruise fan powerplant in which both streams are deflected, the upper stream being deflected through an opening in the airfoil or wing to provide, in conjunction with the lower deflected stream, an upward thrust on the powerplant.

A further object is to provide a nacelle structure in which the cascades may be conveniently stowed during the cruise operation.

Briefly stated, the invention is directed to a jet propulsion powerplant of the cruise fan type which has a tubular casing member or nacelle with a centerbody disposed centrally of the nacelle and the nacelle ends or terminates in a nozzle at its downstream end. The powerplant is cut substantially in half transversely by an airfoil member, such as a wing, to form an upper and lower fluid passage and the wing member has its trailing edge downstream of the nozzle. A tip turbine cruise fan is provided on the centerbody ahead of the airfoil to move thrust fluid through the casing and the two passages. Thrust deflecting means is provided for this powerplant and comprises a louvered cascade supported from the casing or airfoil and carried above the airfoil in the upper passage. A second louvered cascade is supported from one of the members below the airfoil and in the lower passage. Both the airfoil and the nacelle or casing member are provided with openings vertically therethrough. Suitable actuating means is connected to each of the cascades to move the cascades into an open position across its respective passage to intersect thrust fluid and deflect the intersected fluid downwardly through the openings to provide vertical lift on the powerplant. An additional feature is disclosed in making the louvers movable to change the direction of fluid flow from the cascades and additional movable louvers may be provided in the airfoil opening with actuating means therefor to vector the deflected fluid.

While the specification concludes with claims particularly pointing out and distinctly claiming the subject matter which is regarded as the invention, it is believed the invention will be better understood from the following description taken in connection with the accompanying drawing in which:

FIG. 3 is a diagrammatic cross-sectional view showing additional louvers in the wing opening for thrust vectoring; and FIG. 4 is a view similar to FIG. 3 illustrating a modification of actuating mechanism for the upper cascade to provide both vertical and horizontal thrust.

Figure 1:
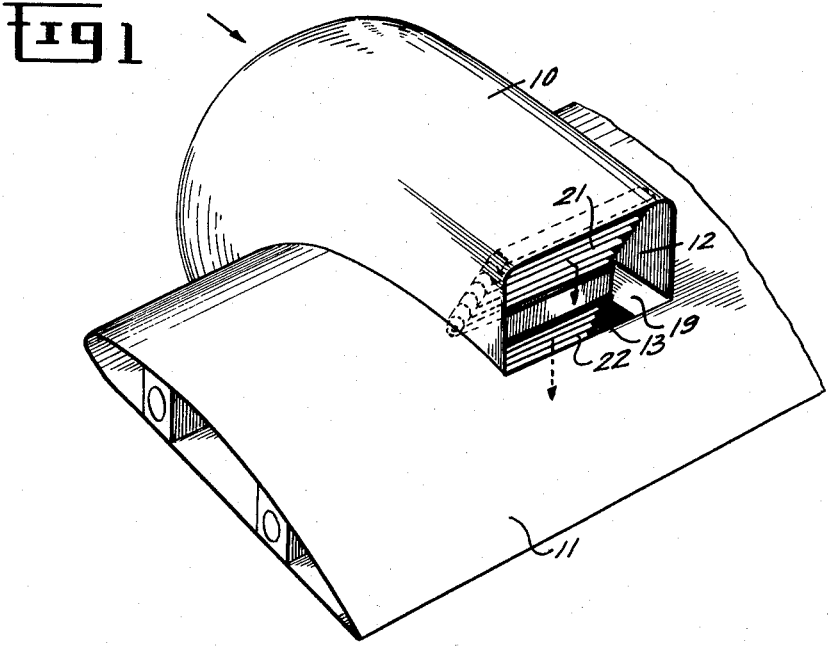
FIG. 1 is a partial perspective view from above the airfoil or wing and with the aft part of the nacelle cut away to show deflection of the upper stream through an opening in the airfoil.

Referring first to FIG. 1, there is shown a typical view as one might see from the window of an aircraft with a powerplant of the instant invention. The powerplant is provided with a tubular casing member or nacelle 10 which is mounted to extend forward of an airfoil or wing member 11 and extends above and below the wing as shown, the wing substantially cutting the casing 10 in half transversely thereof to form an upper passage 12 and a lower passage 13 therethrough. Referring next to FIG. 3, the whole powerplant includes any suitable centerbody 14 by which the nacelle or tubular casing member may be mounted to airfoil 10. In the type of powerplant contemplated, although not limited to such a cruise fan powerplant, the casing member 10 terminates in a nozzle 15 of any suitable conventional type at the downstream end thereof downstream of the centerbody and it preferably extends forward of the trailing edge of the wing member.

In order to move large quantities of thrust fluid, which will be air, at low velocity and provide thrust, a cruise fan 16 conveniently of the tip turbine fan type, may be provided on centerbody 14. Such a tip turbine fan normally employs turbine buckets 17 on the end thereof which are driven by exhaust gas from an exhaust gas generator suitably located and not shown. The exhaust from turbine buckets 17 may be directed into passages 12 and 13 to add to the thrust as is well known. The casing member 10 may thus be supported by suitable struts 18 and the whole jet propulsion powerplant is thus supported on the wing structure. The structure thus far described as the cruise fan mounted forward of the wing so that the flow into the fan is unobstructed and, with this construction ahead of the leading edge of the wing, the nacelle or casing member 10 will be as short as possible. As shown, it is less than the chord of the airfoil to provide an extension of the airfoil beyond the nozzle of the nacelle.

In order to provide vertical force on the powerplant and, in the airfoil or wing installation shown, to provide this force substantially at the center of gravity of the airfoil, it is desired to deflect the airflow through the casing into a downward direction. Because of the transverse cutting of the casing by the airfoil and the consequent upper and lower passages it will be seen that a problem is presented in deflecting the flow in the upper passage down. It is desired to deflect this flow so that it will be close to the flow deflected from the bottom passage so that the net force of both flows is close to the center of gravity of the whole aircraft and close to the center of the airfoil which is where the center of gravity of the aircraft normally would fall. Additionally, it is desired to enclose any deflecting mechanism required within the structure already present such as the nacelle or centerbody or airfoil. In order to deflect the upper flow it is necessary to deflect it after it passes the trailing edge of the airfoil in which case a lift vector is provided too far back causing a moment around the center of gravity. In order to avoid this, it is necessary, as in the instant invention, to provide an opening 19 vertically through the airfoil as shown for the deflected flow from upper passage 12 to pass downwardly. To provide a similar downward passage for the deflected flow from the lower passage 13 an additional vertical opening 20 is provided through the casing member 10. The two flows are directed into the downward direction by thrust deflecting means comprising an upper louvered cascade 21, as best shown in FIGS. 3 and 4, disposed in the upper passage 12 and a similar lower louvered cascade 22 disposed for actuation in the lower passage 13. Any suitable means may be provided for movement of the cascades as a unit into the passages into an open position to intersect the thrust fluid and deflect it downwardly through the openings to provide vertical lift. As shown in FIG. 3, the upper cascade 21 may be supported either from the casing member 10 or from airfoil 11, in the latter case being pivoted at 23 for rotation into wing opening 19 for stowage therein. Any suitable actuating means 24 may operate the cascade from the open position shown, in which deflection of the fluid flow in upper passage 12 through opening 19 is obtained, to the folded or closed position wherein the cascade is stowed in the wing opening 19. During stowage, a suitable closing means, such as a door 25, may be provided and any actuating means, which may be part of actuator 24 or a separate means, is used to close the door 25 over the stowed cascade 21.

Similarly lower cascade 22 may be conveniently pivoted at its upstream end at 26 on the lower part of the casing member 10 and is also movable by rotation under an actuating means 27 into stowed closed position within opening 20 in the lower part of casing 10.

In lieu of a pivotal and rotating arrangement for upper cascade 21, it may be desirable to translate the cascade, as shown in FIG. 4, by any suitable mechanism wherein the cascade is partially retracted so that it does not intersect all of the fluid flow in upper passage 12. In this position part of the fluid flow continues out the nozzle 15 and part is deflected to provide a combination of lift and horizontal thrust on the powerplant. Furthermore, by making the louvers in the cascades 21 and 22 movable by well known means, it will be seen that the direction of the vectored thrust may be changed even to provide thrust reversal. Similarly, in the full cruise position, the lower opening 20 in the casing member is closed by suitable door means 28, as actuated by an actuator 29 all diagrammatically shown in FIG. 4. It is to be understood that the various actuators while shown separately, may all be tied together as required so that a single actuation means operates the various members in the sequence desired. For example, a single actuator might retract and stow the two cascades and then close the doors 25 and 28. Separate actuation means would normally be required for the operation of the louvers since there would be no set pattern for their operation which would depend on the angle of the thrust vector desired.

Referring again to FIG. 3, the same combination of lift and horizontal thrust may be obtained by changing the camber of the individual louvers in the upper cascade so that the outer portion of the cascade as shown permits the fluid in the upper passage 12 to pass to the rear and the remainder to be deflected downwardly.

Additionally, it may be desirable to provide thrust vectoring and this may conveniently be done by the addition of another set of movable louvers 30 as shown in FIG. 3 in the wing opening 19 and these may be movable by a suitable actuator 31 either to rotate or vary the camber thereof so that thrust vectoring may be obtained as shown by the arrows 32.

Figure 2:
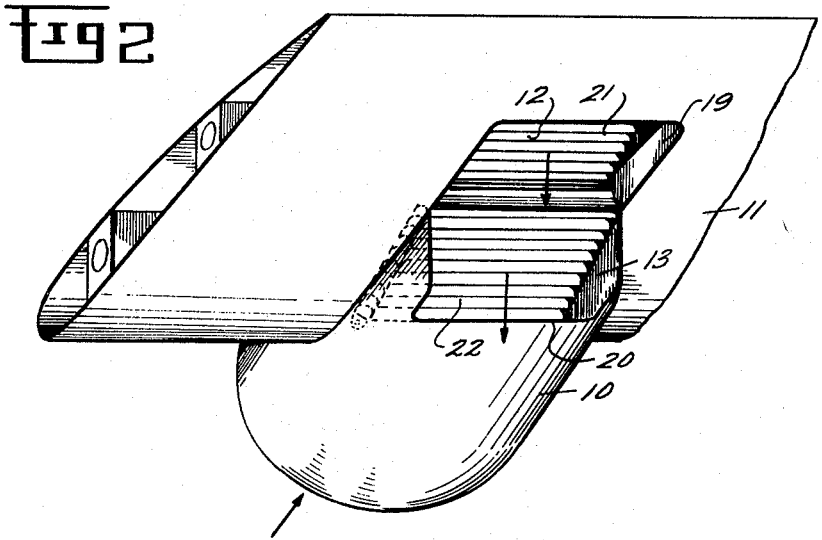
FIG. 2 is a similar view from below the wing showing the deflection of the air from the lower passage of the nacelle.

It will be seen that the combination disclosed provides all the flexibility needed for hover, transition, and horizontal flight while maintaining the deflected thrust substantially at the center of gravity to avoid moments on the aircraft. Additionally, the powerplant may be mounted above and below the wing surface and the airflow over the upper portion of the wing is deflected through an opening in the wing to join with the deflected lower flow. For ease of construction it may be desirable to provide a substantially rectangular configuration at the deflecting portion in order to use flat cascades as clearly shown in FIGS. 1 and 2. It should be understood that the specific mechanisms for rotating the louvers and/or changing the camber of the individual louvers as well as the retracting and door actuating mechanism is not important to the overall combination and that any suitable mechanisms may be used.

While there has been described preferred forms of the invention, obvious modifications and variations are possible in light of the above teachings. It is therefore to be understood that within the scope of the appended claims, the invention may be practiced otherwise than as specifically described.

I claim:

1. A jet propulsion powerplant having a tubular casing member and a centerbody disposed centrally thereof, an airfoil member cutting said casing member and centerbody transversely thereof forming an upper and lower passage and having its trailing edge downstream of said casing,
   means on said centerbody to move thrust fluid longitudinally through said casing and said passages,
   thrust deflecting means comprising,
   a louvered cascade supported from each of said members, one above and one below said airfoil,
   said airfoil and casing members having openings which open vertically downwardly therethrough,
   actuating means connected to said cascades to move each of said cascades as a unit into an open position across said passages to intersect said thrust fluid and deflect the intersected fluid downwardly through said openings to provide vertical lift on said powerplant.

2. Apparatus as described in claim 1 wherein said openings are provided with door means for closing when said cascades are in closed position out of said passages and,
   actuating means connected to said door means for operation thereof.

3. Apparatus as described in claim 1 wherein said louvers in said cascades are movable therein to change the direction of fluid flow therethrough.

4. Apparatus as described in claim 1 wherein additional movable louvers are provided in said airfoil opening and,
   means to actuate said louvers to vector said deflected fluid.

5. Apparatus as described in claim 3 wherein said casing terminates in a nozzle at the downstream end thereof beyond said centerbody.

6. A jet propulsion powerplant of the cruise fan type having a tubular casing member and a centerbody disposed centrally thereof,
   said casing member terminating in a nozzle downstream of said centerbody,
   an airfoil member cutting said casing member and centerbody transversely thereof forming an upper and lower passage and having its trailing edge downstream of said nozzle,
   tip turbine fan means on said centerbody to move thrust fluid longitudinally through said casing and said passages,
   thrust deflecting means comprising,
   a first louvered cascade supported from one of said members and disposed above said airfoil in said upper passage,
   a second louvered cascade supported from one of said members and disposed below said airfoil in said lower passage,
   said airfoil and casing members having openings which open vertically downwardly therethrough,
   actuating means connected to each of said cascades to move each of said cascades as a unit into an open position across its passage to intersect thrust fluid and deflect the intersected fluid downwardly through said openings to provide vertical lift on said powerplant.

7. Apparatus as described in claim 6 wherein said lower cascade is pivoted at its upstream end on the lower part of said casing member and is pivotal into said opening in said casing member.

8. Apparatus as described in claim 7 wherein said louvers in said cascades are movable therein to change the direction of fluid flow therethrough.

9. Apparatus as described in claim 8 wherein said openings are provided with door means for closing when said cascades are in closed position out of said passages and,
   actuating means connected to said door means for operation thereof.

10. Apparatus as described in claim 9 wherein additional movable louvers are provided in said airfoil opening and,
    means to actuate said louvers to vector said deflected fluid.

References Cited by the Examiner

UNITED STATES PATENTS

| | | | |
|---|---|---|---|
| 2,681,548 | 6/1954 | Kappus | 60—35.54 |
| 2,929,580 | 3/1960 | Ciolkosz | 244—12 |
| 2,932,164 | 4/1960 | Watson | 60—35.54 |
| 2,947,501 | 8/1960 | Flint. | |
| 3,016,700 | 1/1962 | Howald | 60—35.54 |
| 3,028,121 | 4/1962 | Klapproth | 244—23 |
| 3,035,792 | 5/1962 | Klapproth | 60—35.54 X |
| 3,040,524 | 6/1962 | Kurti | 60—35.54 |
| 3,087,303 | 4/1963 | Heinze et al. | 60—35.55 |

FOREIGN PATENTS

| | | |
|---|---|---|
| 913,312 | 12/1962 | Great Britain. |
| 922,645 | 4/1963 | Great Britain. |

MARK NEWMAN, *Primary Examiner.*

A. L. SMITH, *Assistant Examiner.*